Feb. 25, 1930.                R. M. GILSON                1,748,763
                    ELECTRICAL APPARATUS INVOLVING CABLES
                           Filed May 11, 1927
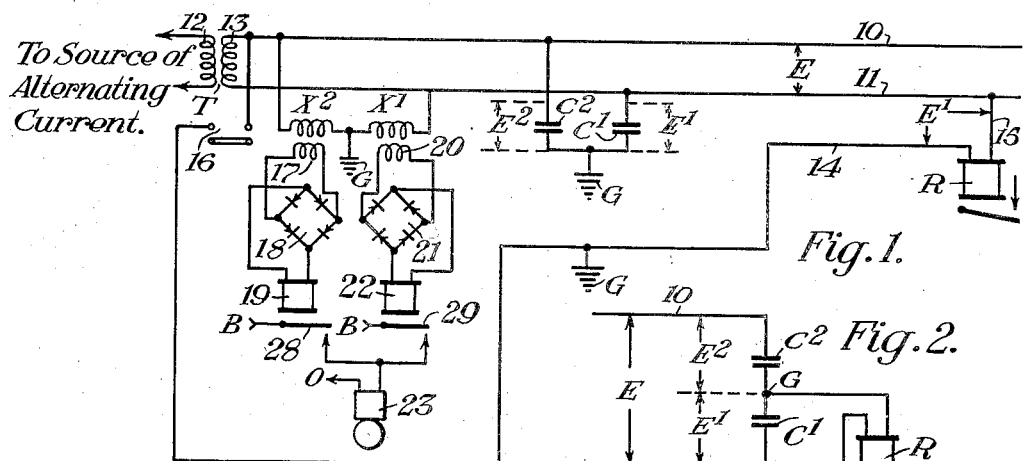
Fig.1.
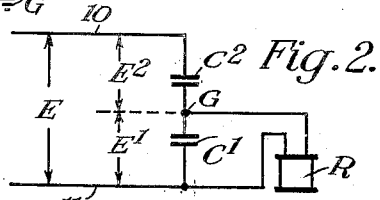
Fig.2.
Fig.4.
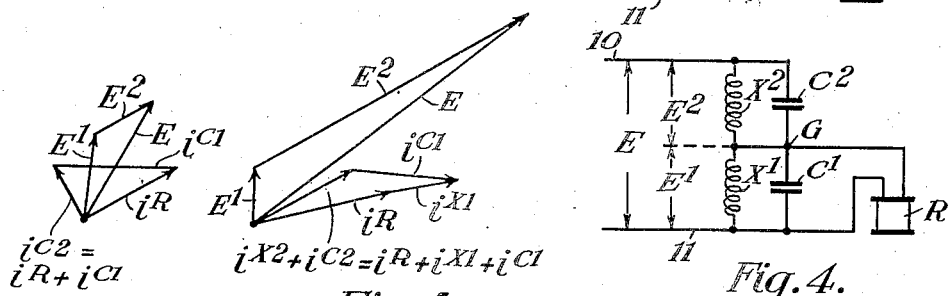
Fig.3.   Fig.5.
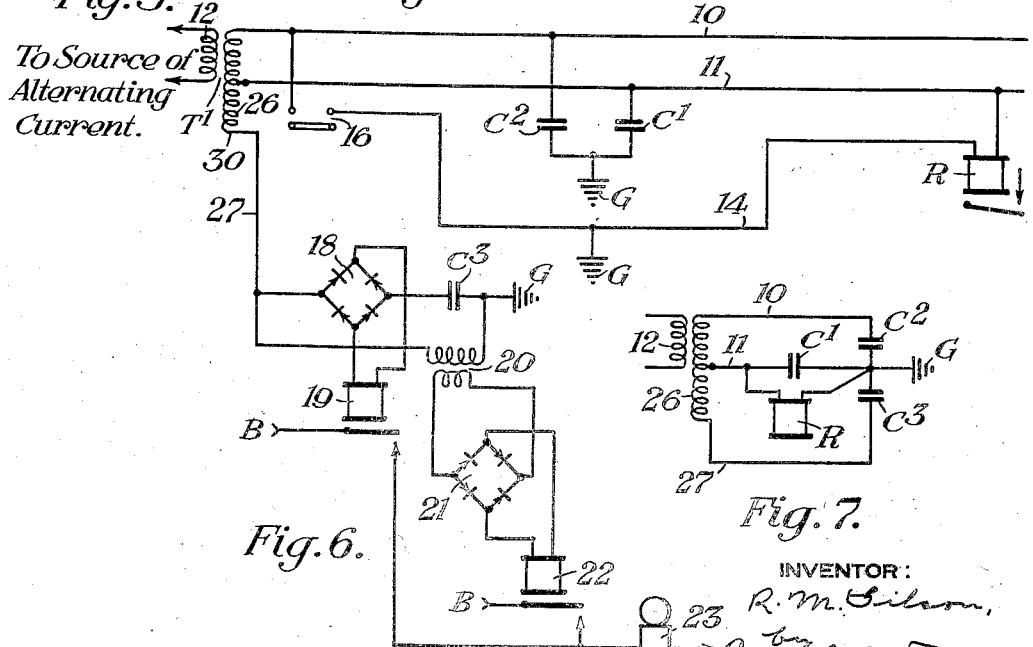
Fig.6.    Fig.7.
INVENTOR:
R. M. Gilson,
by his attorney.

Patented Feb. 25, 1930

1,748,763

UNITED STATES PATENT OFFICE

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL APPARATUS INVOLVING CABLES

Application filed May 11, 1927. Serial No. 190,636.

My invention relates to electrical apparatus of the type involving cables, and has for an object the provision of means for preventing false operation of a device supplied with power through a cable in the event of a connection between one of the controlling wires and ground.

I will describe two forms of apparatus embodying my invention, and will then point out the novel features thereof in claims.

In the accompanying drawing, Fig. 1 is a diagrammatic view showing one form of apparatus embodying my invention. Fig. 2 is a simplified circuit diagram for those portions of the apparatus shown in Fig. 1 not embodying my invention. Fig. 3 is a vector diagram for those portions of the apparatus shown in Fig. 1 not embodying my invention. Fig. 4 is a simplified diagram of the circuits shown in Fig. 1 and including the portions of the apparatus which constitute my invention. Fig. 5 is a vector diagram for the apparatus shown in Fig. 1, including the portions which constitute my invention. Fig. 6 is a diagrammatic view showing a modified form of apparatus embodying my invention. Fig. 7 is a simplified diagram of the circuits shown in Fig. 6.

Similar reference characters refer to similar parts in each of the several views.

Referring first to Fig. 1, the reference characters 10 and 11 designate two power wires which are included in a cable. These wires are constantly supplied with alternating current from a transformer T, the secondary 13 of which is connected with the power wires 10 and 11 and the primary 12 of which is constantly connected with a suitable source of alternating current. The reference character R designates a relay, one terminal of which is connected with the power wire 11 by wire 15, and the other terminal of which is connected with power wire 10 by a control wire 14 and a circuit controller 16. The control wire 14 is preferably included in the same cable as the power wires 10 and 11.

The capacity between power wire 10 and the ground is indicated by a condenser $C^2$, and the capacity between power wire 11 and the ground is indicated by a condenser $C^1$. These condensers are, of course, not present in the actual apparatus and are shown merely to illustrate the actual electrical conditions which exist in a cable.

The voltage between wires 10 and 11 is represented by E, the voltage across condenser $C^1$ is represented by $E^1$, and the voltage across condenser $C^2$ is represented by $E^2$.

With only the apparatus thus far described, I have found that if the control wire 14 becomes grounded, relay R may become energized while circuit controller 16 is open. Referring to Fig. 2, it will be noted that when the control wire 14 is grounded, the relay R becomes connected in parallel with condenser $C^1$, and these two elements are fed with alternating current through condenser $C^2$ by voltage E across wires 10 and 11. I have found that the value of the capacity impedance between wires 10 and 11 and the ground is of about the same order as the impedance of relay R which is chiefly inductive. From an inspection of the vector diagram shown in Fig. 3, it will be seen that the voltage $E^1$ across the terminals of relay R under this abnormal condition may rise to a value aproximately three-fourths of the voltage E across the power wires 10 and 11. The tuning effect between relay R and capacity $C^1$ is largely responsible for this high voltage. Since relays are ordinarily closed on from one-half to three-fourths of their normal voltage, it will be seen that the apparatus thus far described provides an unsafe condition.

To analyze the foregoing somewhat more fully, the line $i^R$ in Fig. 3 represents the current through relay R, while the line $i^{C2}$ represents the current through the capacity $C^2$, this current being, of course, the sum of the currents in relay R and condenser $C^1$. The current in capacity $C^1$, represented by $i^{C1}$, leads the voltage $E^1$ by approximately 90°. $I^R$ lags $E^1$ by a little less than 90° due to a small $i\,r$ drop in relay R. But $I^R$ is almost equal to $i^{C1}$, so the current components which are 180° out of phase practically cancel each other, leaving a resultant current which is approximately in phase with $E^1$. This resultant current is $i^{C2}$. Therefore, $i^R$ and $i^{C2}$ are substantially 90° from each other. The voltage $E^1$ across capacity $C^1$ and relay R lags behind the current in capacity $C^2$, and the voltage E across the wires 10 and 11 lags behind this current by a still greater angle. The voltage $E^2$ across capacity $C^2$ is the line connecting voltages E and $E^1$.

In order to prevent false operation of relay R under the conditions set forth above, I provide two inductive reactances $X^1$ and $X^2$, reactance $X^1$ being connected between power wire 11 and ground G, and reactance $X^2$ being connected between power wire 10 and ground G. Referring to Fig. 4, it will be seen that the reactance $X^2$ is in multiple with capacity $C^2$, and that reactance $X^1$ is in multiple with capacity $C^1$. Considering Fig. 4 and also the vector diagram shown in Fig. 5, it will be seen that the total current due to voltage $E^1$ and flowing through reactor $X^1$, capacity $C^1$ and relay R, all in multiple, must flow through the multiple path furnished by reactor $X^2$ and capacity $C^2$, which path has an impedance approximately five to ten times the impedance of capacity $C^2$ on account of the parallel tuning of the two latter elements. It follows that the voltage drop $E^2$ will be from five to ten times the voltage $E^1$, so that the voltage across the relay R is now a small fraction of the line voltage E and will, therefore, be so much below the pick-up value of the relay that a dangerous condition no longer exists so far as the relay is concerned.

Inasmuch as the protection provided by reactances $X^1$ and $X^2$ depends upon the integrity of these elements, it may be desirable to provide means for checking them. As shown in Fig. 1, the reactance $X^2$ constitutes the primary of a transformer, the secondary 17 of which is connected with a direct current relay 19 through a full-wave rectifier 18. Similarly, reactance $X^1$ constitutes the primary of a transformer, the secondary 20 of which is connected with a direct current relay 22 through a full-wave rectifier 21. An indicating device 23, such as an electric bell, is controlled by back contacts 28 and 29 on these relays in such manner that the bell will ring when either relay is de-energized. That is to say, the bell 23 is provided with two circuits extending from terminal B of a suitable source of current to a terminal O of the same source, one circuit including back contact 28 of relay 19, and the other circuit including back contact 29 of relay 22. As long as neither reactance $X^1$ or $X^2$ is on open circuit or on short circuit, the associated checking relay 22 or 19 will be energized, but in the event of a short circuit or an open circuit in either reactance, the corresponding relay will become de-energized and will cause the bell 23 to ring. The equivalent impedance of the relatively high resistance direct current checking relay transferred to the primary winding constituting the reactance $X^1$ or $X^2$, is so high that it will not affect the tuning value of the reactance to an appreciable extent.

Referring now to Fig. 6, the transformer $T^1$ between the source of alternating current and power wires 10 and 11 comprises a primary 12 and a secondary 26. Wire 10 is connected with one terminal of the secondary 26 and wire 11 is connected with substantially the middle point of secondary 26, so that the potential of terminal 30 of secondary 26 is as much below the potential of wire 11 as the potential of wire 10 is above that of wire 11. Terminal 30 is connected to ground G through a condenser $C^3$ substantially equal in value to capacity $C^2$. Referring now to the simplified diagram given in Fig. 7, since the capacities $C^2$ and $C^3$ are equal, the ground potential at the point between these capacities will be equal to the potential of wire 11. When the control wire 14 for relay R is grounded, the two terminals of this relay will be connected with points having substantially the same potential, and, consequently, the relay cannot be falsely energized when circuit controller 16 is open. No vector diagram is needed to show the conditions existing in the parts of the apparatus shown in Fig. 6.

As shown in Fig. 6, a checking relay 19 is connected in series with condenser $C^3$ through a full-wave rectifier 18, and a checking relay 22 is connected in multiple with condenser $C^3$ through a full-wave rectifier 21 and a transformer 20. Normally both of these checking relays are energized, but if the circuit condenser $C^3$ becomes open relay 19 will be deenergized, whereas if condenser $C^3$ becomes short-circuited relay 22 will be de-energized. An indicating device 23 is controlled by relays 19 and 22 in the same manner as in Fig. 1. Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a cable containing two power wires normally connected with a source of alternating current, a relay one terminal of which is constantly connected with one of said power wires and the other terminal of which is at times connected with the other power wire through a control wire and a circuit controller, an inductive reactance connected between one power wire and ground, and a second inductive reactance connected between the other power wire and ground, the reactance of each said inductive reactance being substantially equal to the capacity reactance between the associated power wire and ground.

2. In combination, a cable containing two power wires normally connected with a source of alternating current, a relay one terminal of which is constantly connected with one of said power wires and the other terminal of which is at times connected with the other power wire through a control wire and a circuit controller, and means associated with said power wires for preventing energization of said relay if said control wire is grounded while said circuit controller is open.

3. In combination, a cable containing two power wires normally connected with a source of alternating current, a relay one terminal of which is constantly connected with one of said power wires and the other terminal of which is at times connected with the other power wire through a control wire and a circuit controller, and reactive means interposed between said power wires and ground for preventing energization of said relay if said control wire is grounded while said circuit controller is open.

In testimony whereof I affix my signature.

ROBERT M. GILSON.